United States Patent
Kotrla (10) Patent No.: US 9,644,445 B2
(45) Date of Patent: May 9, 2017

(54) TUNABLE FLOATING SEAL INSERT

(71) Applicant: Cameron International Corporation, Houston, TX (US)

(72) Inventor: Johnnie Kotrla, Katy, TX (US)

(73) Assignee: Cameron International Corporation, Houston, TX (US)

( * ) Notice: Subject to any disclaimer, the term of this patent is extended or adjusted under 35 U.S.C. 154(b) by 13 days.

(21) Appl. No.: 14/846,405

(22) Filed: Sep. 4, 2015

(65) Prior Publication Data

US 2015/0376973 A1    Dec. 31, 2015

Related U.S. Application Data (63) Continuation of application No. 12/775,414, filed on May 6, 2010, now Pat. No. 9,157,293.

(51) Int. Cl.
| | | |
|---|---|---|
| *E21B 33/064* | (2006.01) | |
| *E21B 34/04* | (2006.01) | |
| *E21B 41/00* | (2006.01) | |
| *F16L 23/032* | (2006.01) | |

(52) U.S. Cl.
CPC ............ *E21B 33/064* (2013.01); *E21B 34/04* (2013.01); *E21B 41/0007* (2013.01); *F16L 23/032* (2013.01)

(58) Field of Classification Search
CPC ............................... F16J 15/441; F16L 23/032
USPC ...... 277/328, 329, 337, 338; 166/86.1, 84.3, 166/84.4, 368
See application file for complete search history.

(56) References Cited

U.S. PATENT DOCUMENTS

| | | | |
|---|---|---|---|
| 1,389,768 A | | 9/1921 | McFarland |
| 1,623,150 A | | 4/1927 | Winesburg |
| 1,947,198 A | | 2/1934 | Goble |
| 2,127,312 A | | 8/1938 | Seamark |
| 2,192,805 A | * | 3/1940 | Seamark ................. E21B 33/06 15/220.4 |
| 2,197,455 A | * | 4/1940 | Volpin ................ F04B 53/1025 137/514.5 |
| 2,643,137 A | | 6/1953 | Smith |
| 2,661,064 A | | 12/1953 | Rockoff |
| 2,749,149 A | * | 6/1956 | Carpenter ........... F16L 23/0283 285/189 |
| 2,937,598 A | | 5/1960 | Brown |
| 3,095,927 A | | 7/1963 | Rhodes |
| 3,225,831 A | | 12/1965 | Knox |

(Continued)

FOREIGN PATENT DOCUMENTS

| | | |
|---|---|---|
| WO | WO 03/048512 | 6/2003 |
| WO | WO 2009/014797 | 1/2009 |

OTHER PUBLICATIONS

PCT International Search Report and Written Opinion; Application No. PCT/US2011/026510; Dated Apr. 18, 2012; 13 pages.

*Primary Examiner* — Kristina Fulton
*Assistant Examiner* — L. Susmitha Koneru
(74) *Attorney, Agent, or Firm* — Fletcher Yoder, P.C.

(57) ABSTRACT

A system including, a mineral extraction component, a conduit fitting coupled to the mineral extraction component, a floating seal insert disposed in the conduit fitting. The floating seal insert includes a feature configured to tune a fluid dynamic characteristic along a liquid flow path through the conduit fitting and the floating seal insert. Furthermore, the fluid dynamic characteristic can be shockwaves, flow rate, turbulence, etc.

24 Claims, 6 Drawing Sheets

(56) References Cited

U.S. PATENT DOCUMENTS

| | | | | |
|---|---|---|---|---|
| 3,321,217 | A * | 5/1967 | Ahlstone | E21B 33/038 166/338 |
| 3,614,111 | A * | 10/1971 | Regan | F16K 7/075 166/84.4 |
| 4,055,338 | A * | 10/1977 | Dyer | E21B 17/07 175/321 |
| 4,073,402 | A | 2/1978 | Wood | |
| 4,226,475 | A * | 10/1980 | Frosch | E21C 41/18 134/17 |
| 4,281,726 | A | 8/1981 | Garrett | |
| 4,358,085 | A * | 11/1982 | Regan | F16J 15/46 251/1.2 |
| 4,448,448 | A | 5/1984 | Pollia | |
| 4,715,526 | A | 12/1987 | MacNeil | |
| 4,766,956 | A * | 8/1988 | Smith | E21B 33/04 166/182 |
| 4,781,387 | A | 11/1988 | Braugh | |
| 4,917,190 | A | 4/1990 | Coppedge | |
| 4,984,830 | A | 1/1991 | Saunders | |
| 5,044,672 | A | 9/1991 | Skeels et al. | |
| 5,066,029 | A | 11/1991 | Gill | |
| 5,224,557 | A * | 7/1993 | Yenulis | E21B 33/085 166/84.3 |
| 5,342,066 | A | 8/1994 | Henley et al. | |
| 5,387,089 | A | 2/1995 | Stogner et al. | |
| 5,456,314 | A | 10/1995 | Boehm, Jr. et al. | |
| 5,492,373 | A | 2/1996 | Smith | |
| 5,617,879 | A * | 4/1997 | Kubala | F16J 15/164 277/398 |
| 5,711,533 | A | 1/1998 | Angelo et al. | |
| 5,904,354 | A | 5/1999 | Collins | |
| 5,944,319 | A | 8/1999 | Kohlman | |
| 6,263,982 | B1 | 7/2001 | Hannegan | E21B 21/001 175/195 |
| 6,439,302 | B1 | 8/2002 | Wiedemann | |
| 6,502,827 | B1 | 1/2003 | Toner | |
| 6,561,521 | B2 * | 5/2003 | Janoff | E21B 33/03 277/603 |
| 6,923,476 | B2 * | 8/2005 | Smith, III | F16L 17/02 251/149.7 |
| 7,114,752 | B2 | 10/2006 | Voelker | |
| 7,325,809 | B2 * | 2/2008 | Brezina | B60H 1/00507 206/223 |
| 7,424,917 | B2 | 9/2008 | Martin | |
| 7,921,919 | B2 | 4/2011 | Horton, III | |
| 8,066,063 | B2 * | 11/2011 | Donald | C22B 3/02 166/368 |
| 8,205,670 | B2 | 6/2012 | Nelson | |
| 8,215,645 | B1 * | 7/2012 | Aho, Jr. | F16J 15/342 277/370 |
| 8,235,125 | B2 | 8/2012 | Borak, Jr. | |
| 8,281,864 | B2 * | 10/2012 | Donald | E21B 33/03 166/368 |
| 8,522,864 | B1 * | 9/2013 | Miller | E21B 33/085 166/368 |
| 8,826,988 | B2 * | 9/2014 | Gray | E21B 23/04 166/338 |
| 2001/0037881 | A1 | 11/2001 | Brecheisen | |
| 2002/0011336 | A1 * | 1/2002 | Baskett | E21B 33/043 166/368 |
| 2002/0070014 | A1 * | 6/2002 | Kinder | E21B 33/085 166/84.3 |
| 2002/0100501 | A1 * | 8/2002 | Hollister | E21B 3/06 137/102 |
| 2004/0159439 | A1 | 8/2004 | Fenton et al. | |
| 2004/0261853 | A1 * | 12/2004 | Jennings | E03C 1/042 137/360 |
| 2006/0159376 | A1 * | 7/2006 | Takayama | B22F 7/008 384/276 |
| 2007/0029081 | A1 | 2/2007 | Shaw | |
| 2009/0057026 | A1 | 3/2009 | Williams | |
| 2009/0199908 | A1 * | 8/2009 | Arnalsteen | B60K 15/03519 137/202 |
| 2009/0315276 | A1 | 12/2009 | Smith, III | |
| 2010/0147533 | A1 | 6/2010 | Nelson | |
| 2010/0193195 | A1 * | 8/2010 | Nguyen | E21B 33/04 166/338 |
| 2010/0326675 | A1 | 12/2010 | Doane et al. | |
| 2011/0024108 | A1 * | 2/2011 | Guidry | E21B 33/04 166/250.01 |
| 2011/0114321 | A1 * | 5/2011 | Guidry | E21B 43/26 166/308.1 |
| 2011/0147002 | A1 | 6/2011 | Kotrla et al. | |
| 2011/0247799 | A1 * | 10/2011 | June | E21B 23/00 166/212 |
| 2011/0308815 | A1 * | 12/2011 | Kotrla | E21B 33/038 166/380 |
| 2012/0037377 | A1 * | 2/2012 | Walker | E21B 17/01 166/345 |
| 2012/0067597 | A1 | 3/2012 | Lang et al. | |
| 2012/0086175 | A1 | 4/2012 | Smith, III | |

* cited by examiner

TUNABLE FLOATING SEAL INSERT

CROSS REFERENCE TO RELATED APPLICATION

This application claims priority to U.S. Non-Provisional patent application Ser. No. 12/775,414, entitled "Tunable Floating Seal Insert", filed on May 6, 2010, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, oil and natural gas have a profound effect on modern economies and societies. Indeed, devices and systems that depend on oil and natural gas are ubiquitous. For instance, oil and natural gas are used for fuel to power modern civilization in a wide variety of mobile vehicles as well as stationary plants and factories of all kinds. Further, oil and natural gas are frequently used to heat homes during winter, and to manufacture an astonishing array of everyday products.

In order to meet the demand for such natural resources, companies often invest significant amounts of time and money in searching for and extracting oil, natural gas, and other subterranean resources from the earth. Particularly, once a desired resource is discovered below the surface of the earth, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling and/or extraction operations. For example, the wellhead assemblies may include a variety of hydraulically actuated equipment, such as a blowout preventer (BOP).

As subsea installations migrate to greater depths, such as 10,000 ft or deeper, greater hydraulic pressures are required to overcome the hydrostatic pressure. As a result, the greater hydraulic pressures can increase the possibility of undesirable shockwaves traveling through the hydraulic lines and equipment upon opening and closing hydraulic valves.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

As discussed in detail below, the disclosed embodiments include a tunable conduit fitting assembly having a fluid-dynamic tuning floating seal insert (e.g., a shock-dampening floating seal insert), which may be selectively replaced with one of a plurality of alternative fluid-dynamic tuning floating seal insert (e.g., shock-dampening floating seal inserts). Each floating seal insert may be tuned to certain fluid dynamics (e.g., expected shockwaves) in a mineral extraction system. For example, each floating seal insert may have one or more internal passages of different diameters, shapes, patterns, or any combination thereof. In certain embodiments, a first floating seal insert may have a single internal passage of a first diameter, a second floating seal insert may have a single internal passage of a second diameter larger than the first diameter, a third floating seal insert may have a single internal passage of a third diameter larger than the first and second diameters, and so forth. However, the disclosed embodiments may include any number (e.g., 1 to 1000) of different floating seal inserts with a single internal passage of a different diameter. Likewise, the disclosed embodiments may include any number (e.g., 1 to 1000) of different floating seal inserts with different numbers and/or patterns of passages with equal or different diameters. For example, a first floating seal insert may have a plurality of passages (e.g., 1 to 50) with a first diameter, shape, or pattern, whereas a second floating seal insert may have a plurality of passages (e.g., 1 to 50) of a second diameter, shape, or pattern different than the first diameter, shape, or pattern. As discussed below, the fluid-dynamic tuning floating seal insert (e.g., shock-dampening floating seal insert) may be selected and/or designed to tune the tunable conduit fitting assembly to fluid dynamics unique to a particular fluid system (e.g., a mineral extraction system), thereby substantially reducing shockwaves and/or increasing performance of the fluid system. An advantage of this tuning is the ability to reduce the size of the equipment, because the equipment is no longer subject to the detrimental effects of shockwaves traveling through the fluid passages. Although the disclosed embodiments are presented in context of dampening shockwaves, the floating seal insert may include a variety of features (e.g., passages, textures, and shapes) to tune a fluid dynamic characteristic (e.g., dampen shockwaves, control flow rates, create or limit turbulence, etc.) along a fluid path.

Figure 1:
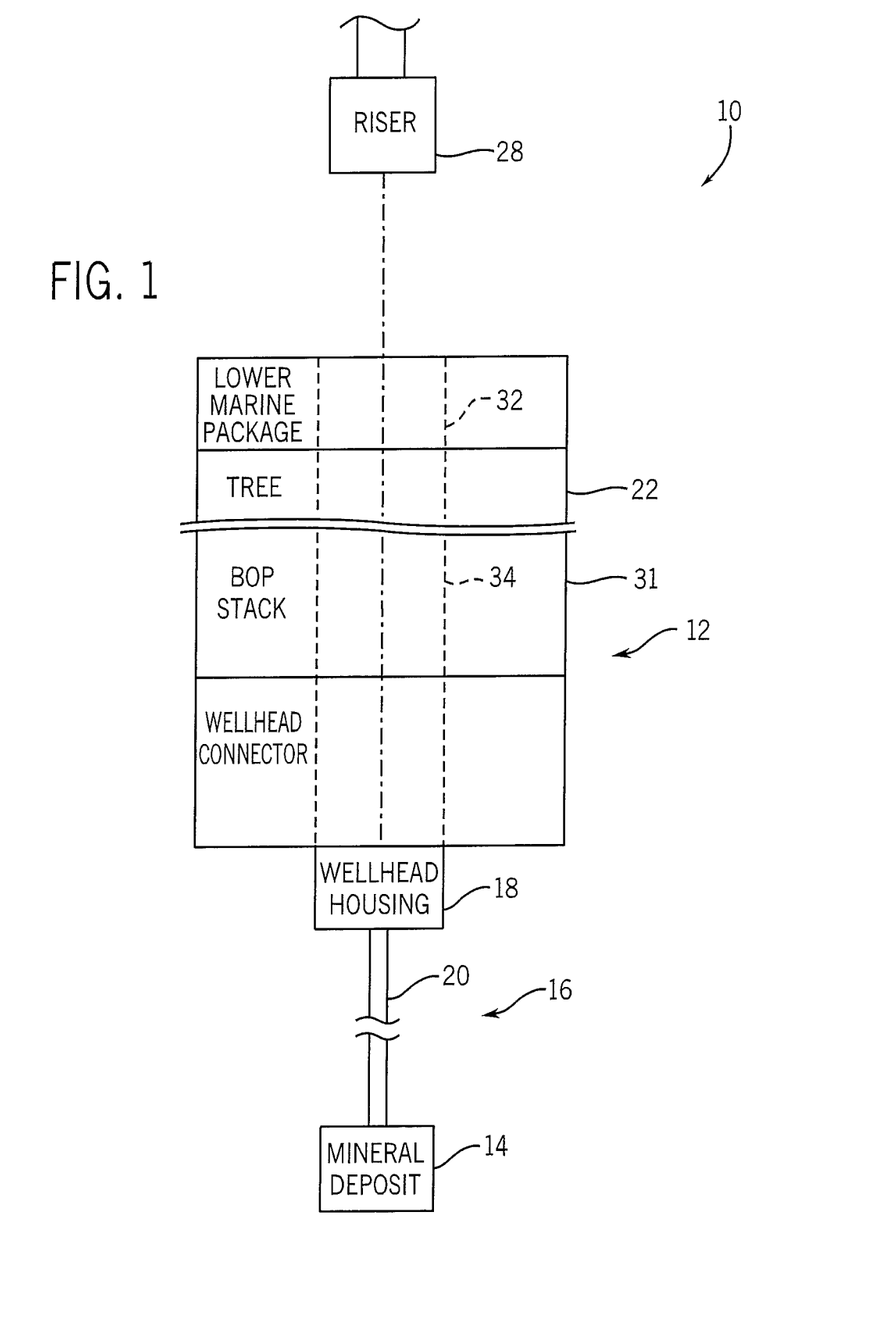
FIG. 1 is a block diagram of a mineral extraction system in accordance with an embodiment of the present invention.

FIG. 1 is a block diagram of an embodiment of a mineral extraction system 10 having one or more tunable conduit fitting assemblies. As discussed below, each tunable conduit fitting assembly includes a fluid-dynamic tuning floating seal insert (e.g., a shock-dampening floating seal insert). The floating seal insert is capable of axial movement along a range of movement when mounted between components, and also includes one or more features to tune the fluid dynamic characteristic (e.g., dampen shockwaves, control flow rates, create or limit turbulence, etc.) in the system 10. The illustrated mineral extraction system 10 can be configured to extract various minerals and natural resources, including hydrocarbons (e.g., oil and/or natural gas), or configured to inject substances into the earth. In some embodiments, the mineral extraction system 10 is land-based (e.g., a surface system) or subsea (e.g., a subsea system). As illustrated, the system 10 includes a wellhead assembly 12 coupled to a mineral deposit 14 via a well 16, wherein the well 16 includes a wellhead hub 18 and a well-bore 20. The wellhead hub 18 generally includes a large diameter hub that is disposed at the termination of the well-bore 20. The wellhead hub 18 provides for the sealable connection of the wellhead assembly 12 to the well 16.

The wellhead assembly 12 typically includes multiple components that control and regulate activities and conditions associated with the well 16. For example, the wellhead assembly 12 generally includes bodies, valves and seals that route produced minerals from the mineral deposit 14, provide for regulating pressure in the well 16, and provide for the injection of chemicals into the well-bore 20 (down-hole). In the illustrated embodiment, the wellhead assembly 12 includes what is colloquially referred to as a Christmas tree 22 (hereinafter, a tree), a tubing spool 24, and other components. The system 10 may include other devices that are coupled to the wellhead assembly 12, and devices that are used to assemble and control various components of the wellhead assembly 12. For example, in the illustrated embodiment, the system 10 includes a riser 28 coupled to a floating rig (not shown). In addition, the system may include various spool bodies, e.g., tubing spool or casing spools, that are used to support strings via hangers, such as tubing hangers that support production tubing and casing hangers that support production casing.

The tree 22 generally includes a variety of flow paths (e.g., bores), valves, fittings, and controls for operating the well 16. For instance, the tree 22 may include a frame that is disposed about a tree body, a flow-loop, actuators, and valves. Further, the tree 22 may provide fluid communication with the well 16. For example, the tree 22 includes a tree bore 32. Moreover, the tree 22 may be a horizontal tree that includes a tree bore 32 that provides for completion and workover procedures, such as the insertion of tools into the well 16, the injection of various chemicals into the well 16 (down-hole), and the like. Further, minerals extracted from the well 16 (e.g., oil and natural gas) may be regulated and routed via the tree 22. For instance, the tree 12 may be coupled to a jumper or a flowline that is tied back to other components, such as a manifold. Accordingly, produced minerals flow from the well 16 to the manifold via the wellhead assembly 12 and/or the tree 22 before being routed to shipping or storage facilities. A blowout preventer (BOP) 31 may also be included during drilling or workover operations, in cooperation with the tree 22 or as a separate device without a tree. The BOP may consist of a variety of valves, fittings, and controls to prevent oil, gas, or other fluid from exiting the well in the event of an unintentional release of pressure or an unanticipated overpressure condition. These valves, fittings, and controls may also be referred to as a "BOP stack."

The tree 22 or BOP 31 may be mounted to a spool body, or wellhead 18. Typically, the tree 22 and BOP are aligned such that the central bores of each of these devices align with the well-bore 20. Thus, the bore in the tree 22 and the BOP 31 provide access to the well bore 20 for various completion and worker procedures. For example, components can be run down to the wellhead assembly 12 to seal-off the well bore 20, to inject chemicals down-hole, to suspend tools down-hole, to retrieve tools down-hole, and the like. The riser 28 may be connected to the wellhead assembly 12 via a lower-marine riser package (LMRP) that facilitates limited movement of the riser 28.

The mineral extraction system 10 includes a variety of fluid lines, e.g., hydraulic control lines, which may be subject to potential shockwaves during operation. For example, the BOP 31 may be hydraulically operated and may close the wellhead assembly 12 or seal off various components of the wellhead assembly 12. Thus, the BOP 31 may be coupled to a source of hydraulic pressure, e.g., a pressurized hydraulic fluid line, to enable hydraulic control of the BOP 31. As discussed below, the disclosed embodiments include one or more tunable conduit fitting assemblies coupled to the BOP 31 and other equipment, wherein each tunable conduit fitting assembly includes a shock-dampening floating seal.

Figure 2:
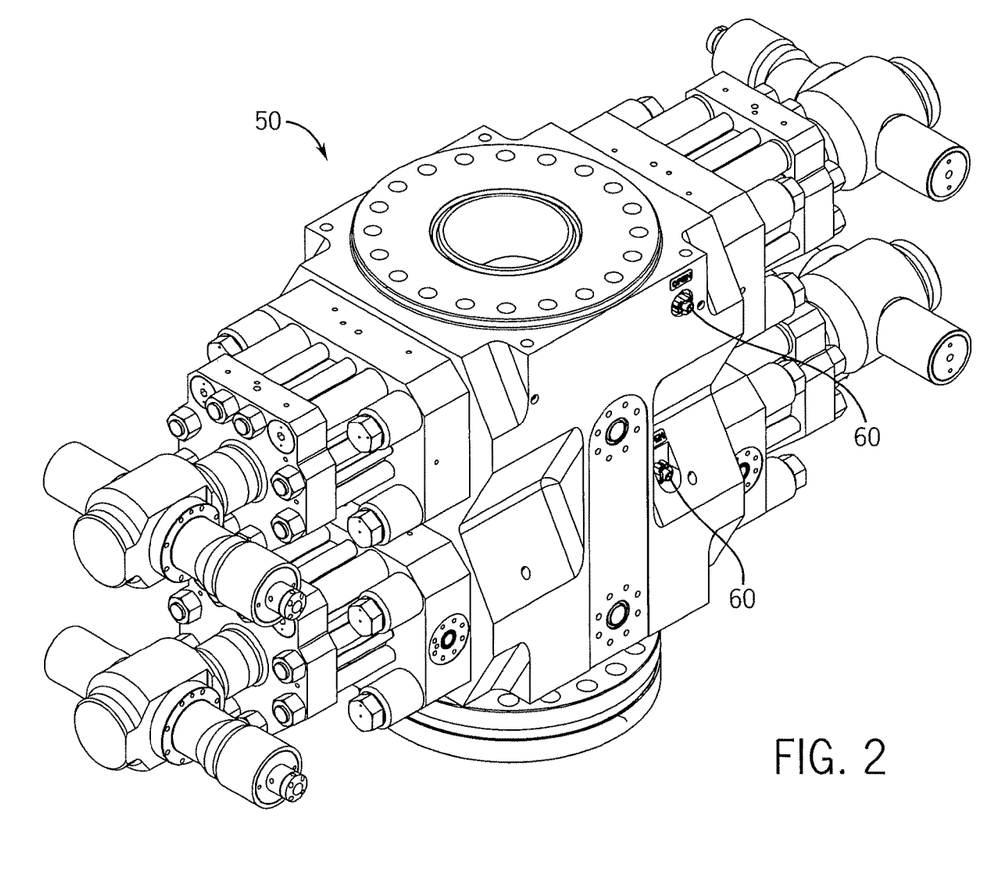
FIG. 2 is a partial perspective view of a blowout preventer (BOP) having tunable conduit fitting assemblies in accordance with an embodiment of the present invention.

FIG. 2 is a perspective view of an embodiment of a blowout preventer (BOP) 50 having a plurality of tunable conduit fitting assembly 60. In certain embodiments, each tunable conduit fitting assembly 60 may be coupled to a fluid conduit. For example, the fluid conduits may lead to an accumulator. The tunable conduit fitting assembly 60 is specifically tuned to the fluid dynamics of the BOP 50 and/or the mineral extraction system 10. For example, the tunable conduit fitting assembly 60 may be specifically designed to dampen shockwaves expected to occur in the BOP 50 and/or mineral extraction system 10. An advantage of this tuning is the ability to reduce the size of the equipment, because the equipment is no longer subject to the detrimental effects of shockwaves traveling through the fluid passages. For example, the tuning may allow usage of downsized or downgraded conduits and fittings with the BOP 50.

Figure 3:
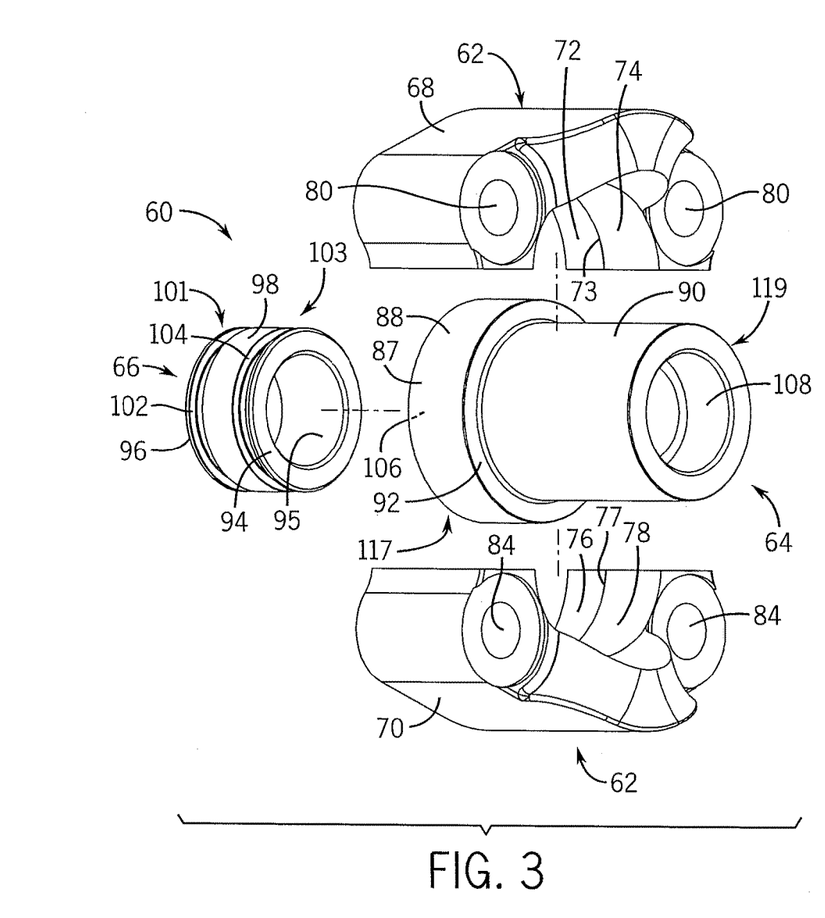
FIG. 3 is an exploded perspective view of an embodiment of the tunable conduit fitting assembly of FIG. 2, illustrating a shock-dampening floating seal insert tuned to fluid dynamics (e.g., expected shockwaves) of the mineral extraction system.

FIG. 3 is an exploded perspective view of an embodiment of the tunable conduit fitting assembly 60 of FIG. 2. In the illustrated embodiment, the conduit fitting assembly 60 includes a split flange assembly 62, a conduit fitting 64, and a fluid-dynamic tuning floating seal insert (e.g., a shock-dampening floating seal insert) 66. In certain embodiments, the flange assembly 62 may be manufactured as a one-piece flange (e.g., a hinged flange) or a multi-piece flange with greater than two pieces. As discussed in detail below, the floating seal insert 66 may be configured to float (e.g., move in an axial direction) while disposed in the assembly 60, thereby enabling the floating seal insert 66 to maintain a seal despite movement between components coupled to the conduit fitting assembly 60. Furthermore, the floating seal insert 66 may be specifically designed (e.g., tuned) to dampen shockwaves of a certain frequency, wavelength, and/or magnitude. In the illustrated embodiment, the floating seal insert 66 is tuned to dampen shockwaves unique to fluid dynamics of the mineral extraction system 10 and/or the BOP 31 or 50. In certain embodiments, the floating seal insert 66 is tuned to control other fluid dynamic characteristics, such as the flow rate, turbulence, and so forth.

As illustrated, the split flange assembly 62 comprises a first flange section 68 and a second flange section 70. The first flange section 68 may define a first flange 73 (e.g., a first axial abutment surface) between a first cylindrical mating surface 72 and a second cylindrical mating surface 74. More specifically, the first cylindrical mating surface 72 has a larger diameter than the second cylindrical mating surface 74, thereby defining a disc-shaped step as the first flange 73 between the surfaces 72 and 74. The second flange section 70 may define a second flange 77 (e.g., a second axial abutment surface) between a third cylindrical mating surface 76 and a fourth cylindrical mating surface 78. Again, the third cylindrical mating surface 76 has a larger diameter than the fourth cylindrical mating surface 78, thereby defining a disc-shaped step as the second flange 77 between the surfaces 76 and 78. In addition, the first flange section 68 may define a plurality of bolt receptacles 80, and the second flange section 70 may also define a plurality of bolt receptacles 84. The bolt receptacles 80 and 84 receive bolts to fasten the split flange assembly 62 to a component, such as the BOP 31 or 50. In the illustrated embodiment, the split flange assembly 62 includes four bolt receptacles 84. In certain embodiments, the flange assembly 62 may include any number of bolt receptacles 84 in a split flange construction (e.g., illustrated sections 68 and 70), a one-piece construction, or a multi-piece construction (e.g., two or more sections).

The conduit fitting 64 includes a first cylindrical exterior surface 88 and a second cylindrical exterior surface 90. As illustrated, the diameter of the first cylindrical exterior surface 88 is larger than the diameter of the second cylindrical exterior surface 90, thereby defining an intermediate flange 92 (e.g., axial abutment surface or coupling 117). For example, the intermediate flange 92 (e.g., coupling 117) may be described as a disc-shaped step between the surfaces 88 and 90. As discussed below, the intermediate flange 92 mates with the flanges 73 and 77 of the first and second flange sections 68 and 70, thereby enabling the split flange assembly 62 to bias the conduit fitting 64 (e.g., component) against a component (e.g., BOP 31 or 50). In addition, the conduit fitting 64 includes a first counterbore 106 within the first cylindrical exterior surface 88, and a second counterbore 108 (e.g., coupling 119) within the second cylindrical exterior surface 90.

The floating seal insert 66 is configured to mount within the first counterbore 106 of the conduit fitting 64, while maintaining the ability to float (e.g., move) in an axial direction after the conduit fitting assembly 60 is mounted between components (e.g., conduit and BOP). The illustrated floating seal insert 66 includes a first disc-shaped contact surface 94 and a second disc-shaped contact surface 96, e.g., opposite axial ends of the insert 66. In addition, the floating seal insert 66 includes an annular exterior surface 98 and a shock-dampening fluid passage 95. As discussed below, the shock-dampening fluid passage 95 may be a single passage configured to enable fluid flow, while also dampening any shockwave traveling in the fluid flow. In particular, the shock-dampening fluid passage 95 may be specifically tuned to certain shockwaves, e.g., frequency, wavelength, and/or magnitude. In the illustrated embodiment, the shock-dampening fluid passage 95 may be specifically tuned to shockwaves expected in the BOP 31 or 50. The annular exterior surface 98 may include a first annular groove 102 along a portion 101 of the conduit fitting 64, and a second annular groove 104 along a portion 103 of the conduit fitting 64. The grooves 102 and 104 are configured to support seals 105 and 107 (e.g., O-rings) between the surface 98 of the floating seal insert 66 and the surfaces 72 and 76 of the first and second flange sections 68 and 70. The axial spacing of these grooves 102 and 104, and thus the seals, enables the floating seal insert 66 to maintain a sealed connection over a range of movement within the conduit fitting assembly 60.

Figure 4:
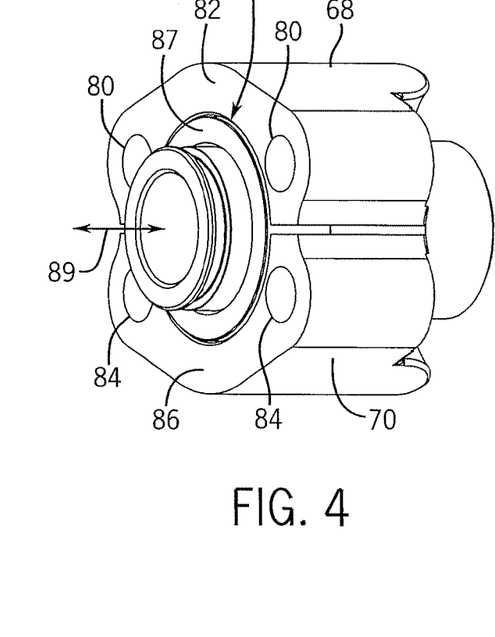
FIG. 4 is an assembled perspective view of an embodiment of the tunable conduit fitting assembly of FIG. 3.

FIG. 4 is an assembled perspective view of an embodiment of the tunable conduit fitting assembly 60 of FIG. 3, illustrating the floating seal insert 66 disposed inside the conduit fitting 64. Referring generally to FIGS. 3 and 4, the first mating surface 72 and the second mating surface 74 of the first flange section 68 are mated respectively to the first exterior surface 88 and the second exterior surface 90 of the conduit fitting 64. The first flange 73 of the first flange section 68 abuts against the flange 92 of the conduit fitting 64. Similarly, the third mating surface 76 and the fourth mating surface 78 of the second flange section 70 mate respectively with the first exterior surface 88 and the second exterior surface 90 of the conduit fitting 64. The second flange 77 of the second flange section 70 abuts against the flange 92 of the conduit fitting 64. In addition, the first flange section 68 defines a first contact surface 82 and the second flange section 70 includes a second contact surface 86.

The floating seal insert 66 is partially inserted into the conduit fitting 64 until the first disc-shaped contact surface 94 contacts a disc-shaped surface inside the first counterbore 106 of the conduit fitting 64 (e.g., component). Furthermore, the conduit fitting 64 includes a disc-shaped contact surface 87 (e.g., mounting interface). The surfaces 82, 86, and 87 are configured to engage a mounting surface (e.g., mounting interface or face 128) of a component (e.g., BOP 31 or 50), which receives bolts through the bolt receptacles 80 and 84. While the tunable conduit fitting assembly 60 is mounted to the component, the floating seal insert 66 is able to move (e.g., float) along an axial range of motion 89 within the conduit fitting 64 and the component. For example, one seal disposed within the groove 104 maintains a floating seal with the conduit fitting 64, while another seal disposed within the groove 102 maintains a floating seal with the component (e.g., BOP 31 or 50). The floating seal insert 66 also dampens shockwaves in the fluid flow, as discussed further below.

Figure 5:
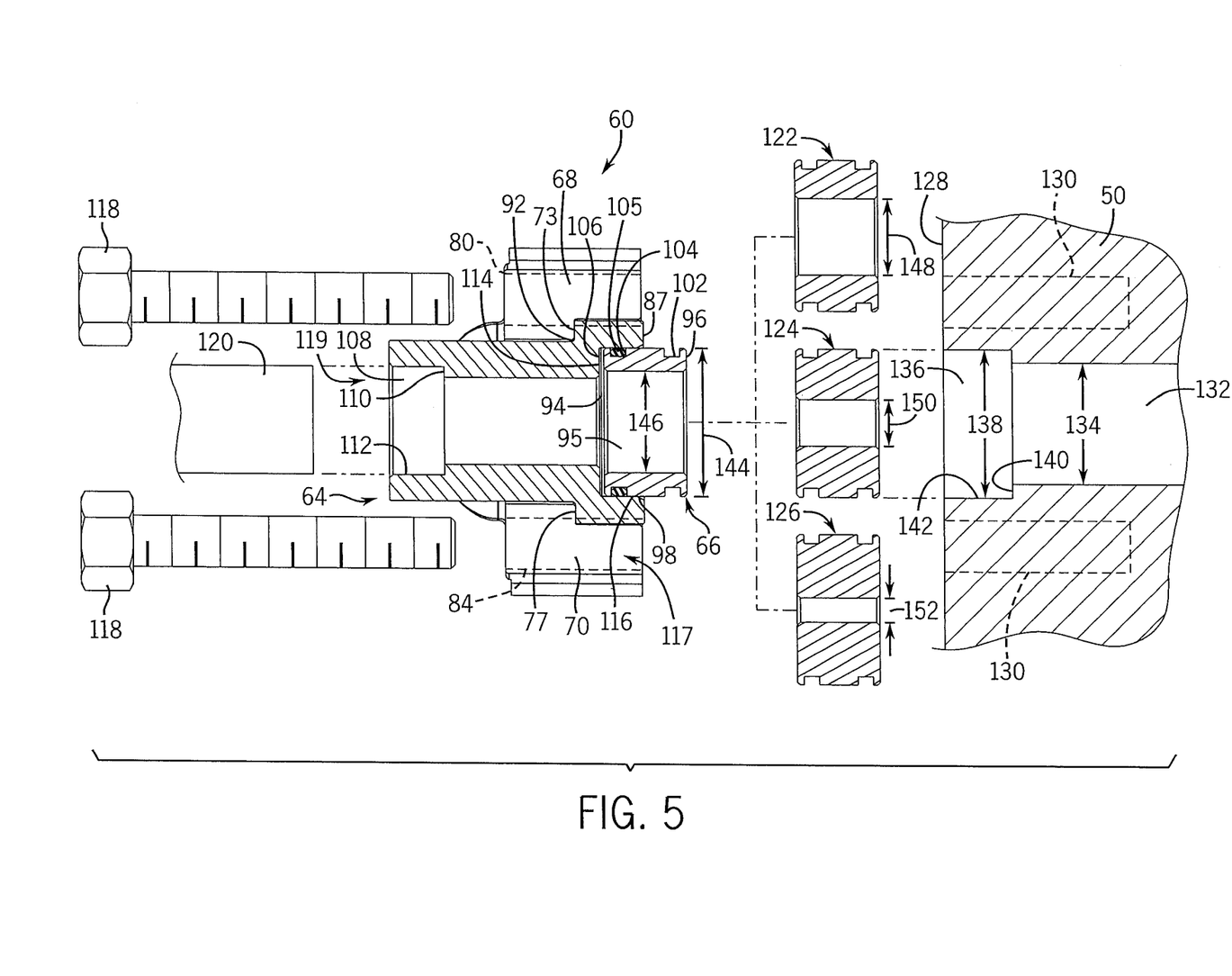
FIG. 5 is a cross-sectional side view of an embodiment of the tunable conduit fitting assembly of FIGS. 2-4, illustrating the tunable conduit fitting assembly exploded from a BOP, a conduit, and three alternative shock-dampening floating seal inserts tuned to different fluid dynamics (e.g., expected shockwaves) of the mineral extraction system.

FIG. 5 is an exploded cross-sectional side view of an embodiment of the tunable conduit fitting assembly 60 exploded from the BOP 50 and a conduit 120, further illustrating alternative fluid-dynamic tuning floating seal insert (e.g., shock-dampening floating seal inserts) 122, 124, and 126 that may be selectively used instead of the floating seal insert 66. As discussed below, each floating seal insert 66, 122, 124, and 126 may be tuned to specific fluid dynamics, such as shockwave characteristics (e.g., frequency, wavelength, and/or amplitude), flow rates, turbulence, and so forth. Thus, each floating seal insert 66, 122, 124, and 126 may have different characteristics (e.g., number, shape, and pattern) of internal fluid passages to control the fluid dynamics. Before discussing details of these inserts 122, 124, and 126, a mounting arrangement of the tunable conduit fitting assembly 60 is discussed in context of the BOP 50 and the conduit 120.

The shock-dampening floating seal inserts 66, 122, 124, and 126 are selectively mounted into the first counterbore 106 of the conduit fitting 64. As illustrated, the first counterbore 106 of the conduit fitting 64 includes a disc-shaped surface 114 and an annular surface 116, wherein the disc-shaped surface 114 is generally crosswise (e.g., perpendicular) to the annular surface 116. Similarly, the second counterbore 108 (e.g., coupling 119) of the conduit fitting 64 (e.g., component) includes a disc-shaped surface 110 and an annular surface 112, wherein the disc-shaped surface 110 is generally crosswise (e.g., perpendicular) to the annular surface 112. The floating seal insert 66 is inserted into the conduit fitting 64 until the first disc-shaped contact surface 94 contacts the disc-shaped surface 114 of the first counterbore 106. Furthermore, an annular seal 105 (e.g., O-ring) is placed within the groove 104 to create a floating seal between the insert 66 and the fitting 64. The annular seal 105 contacts the annular surface 116 of the first counterbore 106, and slides along the annular surface 116 during axial movement of the insert 66 in the fitting 64. As discussed below, an annular seal (e.g., O-ring) is also placed within the groove 102 to create a floating seal between the insert 66 and the BOP 50.

The conduit fitting assembly 60 may be configured for attachment to a face 128 (e.g., mounting interface) of the BOP 50 (e.g., component). The BOP 50 may define bolt receptacles 130 for receiving bolts 118, a bore 132 having a diameter 134, and a counterbore 136 having a diameter 138 greater than the diameter 134. During mounting, the bolts 118 are inserted through the bolt receptacles 80 and 84 of the conduit fitting assembly 60 and into the bolt receptacles 130, which may be threaded to create a threaded connection with the bolts 118. The counterbore 136 includes a disc-shaped surface 140 and an annular surface 142. The disc-shaped surface 140 is generally crosswise (e.g., perpendicular) to the annular surface 142. The counterbore 136 is configured to receive a portion of the floating seal insert 66, including the groove 102 and an annular seal (e.g., O-ring), such that the floating seal insert 66 maintains a floating seal inside the counterbore 136. Furthermore, the diameter 138 of the counterbore 136 may be equal to or slightly larger than a diameter 144 of the floating seal insert 66 to enable axial movement of the floating seal insert 66 within the counterbore 136. The range of axial movement (e.g., float) of the floating seal insert 66 is limited by the disc-shaped surface 114 in the conduit fitting 64 and the disc-shaped surface 140 in the BOP 50. For example, the range of axial movement may range between approximately 1 to 50, 1 to 40, 1 to 30, 1 to 20, or 1 to 10 percent of the length of the floating seal insert 66.

In addition, the shock-dampening fluid passage 95 of the floating seal insert 66 defines a diameter 146 tuned to the fluid dynamics in the mineral extraction system 10 and/or the BOP 50. One unique feature of the floating seal insert 66 is the ability to dampen shockwaves in the fluid flow, particularly tuned to the fluid dynamics for more effective dampening. A shockwave may be described as a propagating disturbance in the fluid flow, e.g., a high-pressure disturbance or wave that flows at a high velocity through the fluid flow. For example, the shockwave may include water hammer, which may include a pulse of multiple high-pressure waves in the fluid passage. However, the floating seal insert 66 is not limited to shock dampening. The shock-dampening fluid passage 95 may be tuned to the fluid dynamics for a variety of reasons, including but not limited to dampening shockwaves. For example, the fluid passage 95 may be sized and/or shaped (e.g., different diameter 146) to produce specific fluid dynamics desired in the mineral extraction system 10 and/or the BOP 50. Accordingly, the floating seal inserts 122, 124, 126 include different interior diameters 148, 150, and 152 configured to enable tuning of the conduit fitting assembly 60 to different fluid dynamics in the mineral extraction system 10 and/or the BOP 50. These different embodiments of the floating seal inserts 66, 122, 124, 126 demonstrate that the diameter can vary significantly from the bore diameter 132 depending on the desired fluid dynamic characteristic being tuned.

In particular, shockwaves can be particularly harmful to the BOP 50, conduits, and fittings. The shockwaves have characteristics including frequencies, wavelengths, and amplitudes. These characteristics indicate the strength, and destructive power, of the shockwaves. The floating seal inserts 66, 122, 124, and 126 are configured to dampen and/or absorb energy of the shockwaves, wherein each insert 66, 122, 124, and 126 is particularly effective for different shockwave characteristics. For example, the floating seal insert 66 may be tuned to dampen and/or absorb energy of a first shockwave (e.g., first frequency, wavelength, and/or amplitude), the floating seal insert 122 may be tuned to dampen and/or absorb energy of a second shockwave (e.g., second frequency, wavelength, and/or amplitude), the floating seal insert 124 may be tuned to dampen and/or absorb energy of a third shockwave (e.g., third frequency, wavelength, and/or amplitude), and the floating seal insert 126 may be tuned to dampen and/or absorb energy of a fourth shockwave (e.g., fourth frequency, wavelength, and/or amplitude). By tuning the conduit fitting assembly 60 to these shockwaves, the shock-dampening floating seal inserts 66, 122, 124, and 126 effectively protect the control valves, regulators, flow meters, conduits, fittings, BOP 50, and other features along the fluid flow path. One advantage of this protection is the ability to use less bulky equipment, conduits, and fittings, because there is no longer a threat of damage from the expected shockwaves.

Figure 6:
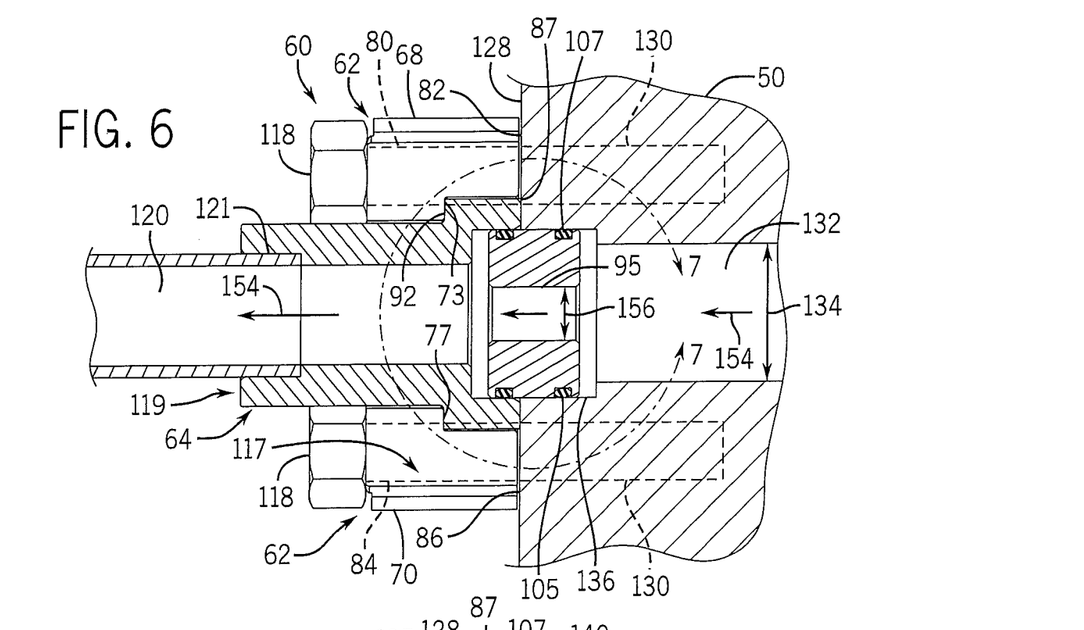
FIG. 6 is a cross-sectional side view of an embodiment of the tunable conduit fitting assembly of FIG. 5, illustrating the tunable conduit fitting assembly coupled to the BOP and the conduit.

FIG. 6 is a cross-sectional side view of an embodiment of the tunable conduit fitting assembly 60 of FIG. 5, illustrating the tunable conduit fitting assembly 60 coupled to the BOP 50 and the conduit 120. As illustrated, the bolts 118 extend through the bolt receptacles 80 and 82 of the respective first and second flange sections 68 and 70, and thread into the bolt receptacles 130 of the BOP 50. As the bolts 118 thread into the receptacles 130, the bolts 118 pull the conduit fitting assembly 60 against the BOP 50. Eventually, the bolts 118 bias the first contact surface 82 of the first flange section 68 and the second contact surface 86 of the second flange section 70 against the face 128 of the BOP 50. Furthermore, as the bolts 118 pull the flange sections 68 and 70 against the face 128, the first flange 73 of the first flange section 68 and the second flange 77 of the second flange section 70 contact and the flange 92 of the conduit fitting 64 to bias the conduit fitting 64 toward the face 128 of the BOP 50. As a result, the bolts 118 bias the disc-shaped contact surface 87 (e.g., mounting interface) of the conduit fitting 64 (e.g., component) against the face 128 (e.g., mounting interface) of the BOP 50 (e.g., component).

As further illustrated in FIG. 6, the conduit 120 is coupled to the second counterbore 108 of the conduit fitting 64 via an interface 121 (e.g., coupling 119). For example, the interface 121 (e.g., coupling 119) may include a welded joint, a brazed joint, an adhesive coupling, a threaded connection, an interference fit, a shrink-fit, or any combination thereof. The conduit 120 may include a rigid or flexible conduit, such as a metal conduit, a rubber conduit, or a plastic conduit. In the illustrated embodiment, the floating seal insert 66 is disposed between the conduit fitting assembly 60 and the BOP 50. However, in certain embodiments, a floating seal insert 66 may be disposed between the conduit 120 and the conduit fitting assembly 60. For example, a first floating seal insert 66 may be disposed between the conduit 120 and the conduit fitting assembly 60, and a second floating seal insert 66 may be disposed between the BOP 50 (or another component) and the conduit fitting assembly 60. In such an embodiment, the first floating seal insert 66 may be tuned to a first fluid dynamic characteristic and the second floating seal insert 66 may be tuned to a second fluid dynamic characteristic.

The floating seal insert 66 creates a movable (e.g., floating) seal between the insert 66 and both the fitting 64 (e.g., component) and the BOP 50 (e.g., component). As illustrated, the floating seal insert 66 includes the annular seal 105 (e.g., in portion 101) axially movable in the first counterbore 106 of the conduit fitting 64 (i.e., on a first side of the mounting interface 87, 128) and an annular seal 107 (e.g., in portion 103) axially movable in the counterbore 136 of the BOP 50 (i.e., on a second side of mounting interface 87, 128). In operation, the floating seal insert 66 is able to move axially in a cylindrical cavity 153 defined by the counterbores 106 and 136. For example, if the system is subject to vibration or shockwaves, then the floating seal insert 66 is able to maintain a seal across the mounting interface 87, 128 despite movement of the components.

Furthermore, the floating seal insert 66 is tuned to the system to dampen shockwaves and/or improve other fluid dynamics. The illustrated system includes a flow path 154 extending through the BOP 50, the conduit fitting assembly 60, and the conduit 120. In the illustrated embodiment, the diameter 134 of the bore 132 of the BOP 50 is larger than a diameter 156 of the shock-dampening fluid passage 95 of the conduit-fitting insert 66. For example, the diameter 156 may be specifically sized to dampen shockwaves expected in the system, e.g., based on testing. This ability to completely or substantially absorb the shockwave allows for greater reliability of the BOP 50 by preserving the control valves, regulators, flow meters, conduits, fittings, and various connections. Although the flow path 154 is illustrated as traveling from the BOP 50 toward the conduit 120, the shock-dampening floating seal insert 66 also functions in the reverse flow direction.

Figure 7:
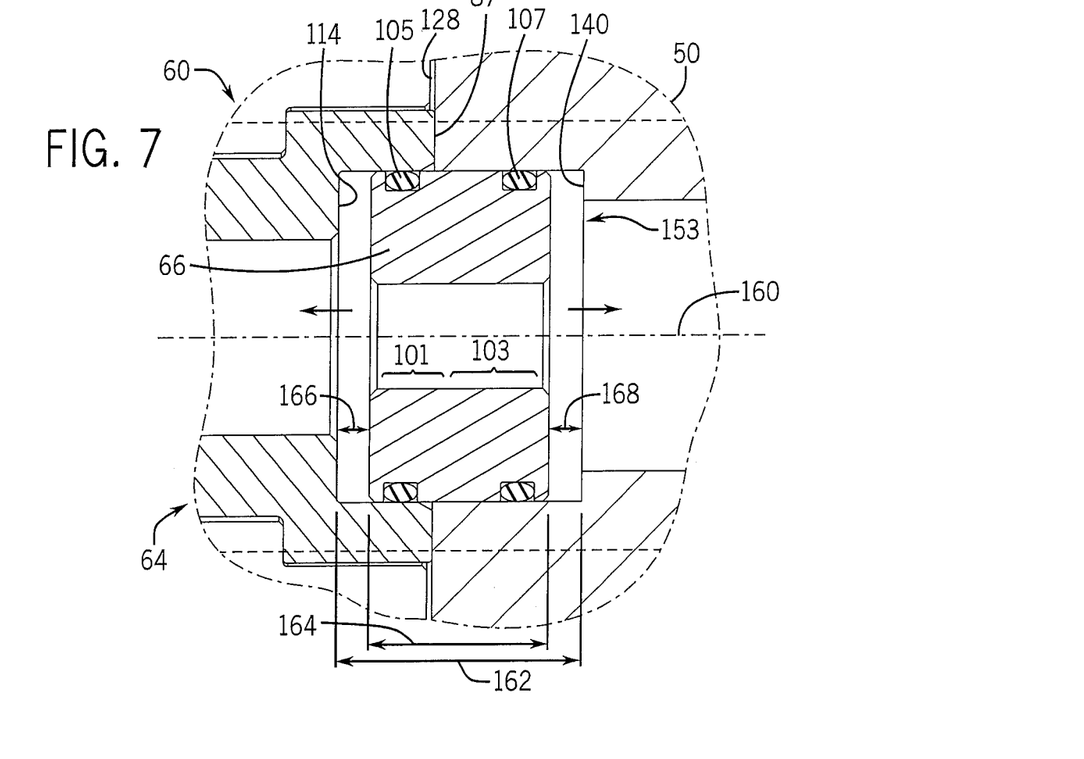
FIG. 7 is a partial cross-sectional side view of an embodiment of the tunable conduit fitting assembly of FIG. 6, illustrating an axial range of motion (e.g., float) of the shock-dampening floating seal insert.

FIG. 7 is a partial cross-sectional side view of an embodiment of the tunable conduit fitting assembly 60 of FIG. 6, illustrating an axial range of motion (e.g., float) along an axis 160 of the shock-dampening floating seal insert 66. As illustrated, an axial length 162 of the cylindrical cavity 153 is greater than an axial length 164 of the floating seal insert 66, thereby leaving an axial gap represented by a first axial gap 166 and a second axial gap 168. As a result, the floating seal insert 66 is free to move (e.g., float) along the axis 160 between the disc-shaped surface 114 in the counterbore 106 and the disc-shaped surface 140 in the counterbore 136 (i.e., across mounting interface 87, 128). In certain embodiments, the axial length 162 may be greater than the axial length 164 by at least approximately 1 to 500 percent, 5 to 100 percent, or 10 to 50 percent. However, the ratio of these lengths 164 and 164 may vary depending on the desired degree of axial play (e.g., gaps 166 and 168) in the system. In certain embodiments, a first spring may be placed in the axial gap 166 and/or a second spring may be placed in the axial gap 168. The springs may be configured to dampen shock or vibration of the floating seal insert 66, while also providing a cushion between the floating seal insert 66 and the disc-shaped surfaces 114 and 140.

Figure 8:
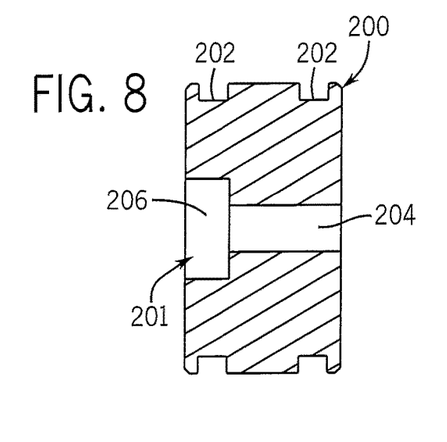
FIG. 8 is a cross-sectional side view of an embodiment of the shock-dampening floating seal insert of FIGS. 2-7, illustrating a stepped internal passage tuned to certain fluid dynamics in the mineral extraction system.

FIG. 8 is a cross-sectional side view of an embodiment of a fluid-dynamic tuning floating seal insert (e.g., a shock-dampening floating seal insert) 200 of FIGS. 2-7, illustrating a stepped internal passage 201 tuned to certain fluid dynamics in the mineral extraction system 10. The floating seal insert 200 includes annular grooves 202 configured to accept annular seals (e.g., O-rings). These annular seals enable the floating seal insert 200 to maintain a seal despite movement of the insert 200. In the illustrated embodiment, the stepped internal passage 201 includes a plurality of bores of different diameters, e.g., a first cylindrical bore 204 and a second cylindrical bore 206. The bore 204 has a smaller diameter and a greater length than the bore 206. Alternatively, the bore 204 may have a larger diameter and/or a shorter length than the bore 206. In certain embodiments, the stepped internal passage 201 may include 2 to 100, 2 to 10, or 2 to 5 bores of different diameters. The diameters may progressively increase from one side to another, or the diameters may alternatingly increase and decrease from one side to another. The stepped internal passage 201 may be specifically tuned to the mineral extraction system, 10, such that the stepped internal passage 201 is able to control fluid dynamics (e.g., dampen shockwaves, improve fluid flow, control mixing, etc.).

Figure 9:
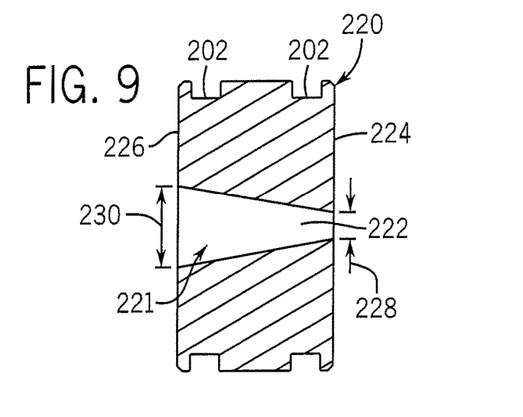
FIG. 9 is a cross-sectional side view of an embodiment of the shock-dampening floating seal insert of FIGS. 2-7, illustrating a diverging internal passage tuned to certain fluid dynamics in the mineral extraction system.

FIG. 9 is a cross-sectional side view of an embodiment of a fluid-dynamic tuning floating seal insert (e.g., a shock-dampening floating seal insert) 220 of FIGS. 2-7, illustrating a diverging internal passage 221 tuned to certain fluid dynamics in the mineral extraction system 10. The floating seal insert 220 includes the annular grooves 202 configured to accept annular seals (e.g., O-rings). These annular seals enable the floating seal insert 220 to maintain a seal despite movement of the insert 220. In the illustrated embodiment, the diverging internal passage 221 includes a conical bore 222 that progressively decreases in diameter from a first side 224 to a second side 226 of the insert 220. The bore 222 has a smaller diameter 228 at the first side 224 and a larger diameter 230 at the second side 224. Alternatively, the bore 222 may have a larger diameter 228 at the first side 224 and a smaller diameter 230 at the second side 224. In the illustrated embodiment, the diverging internal passage 221 is defined by a single conical bore 222. In other embodiments, the diverging internal passage 221 may include a plurality of diverging or converging bores 222, e.g., between 2 to 100, 2 to 10, or 2 to 5 conical bores having different angles. For example, the angles of the conical bores may progressively increase or decrease between the first side 224 and the second side 226. The diverging internal passage 221 may be specifically tuned to the mineral extraction system, 10, such that the diverging internal passage 221 is able to control fluid dynamics (e.g., dampen shockwaves, improve fluid flow, control mixing, etc.).

Figure 10:
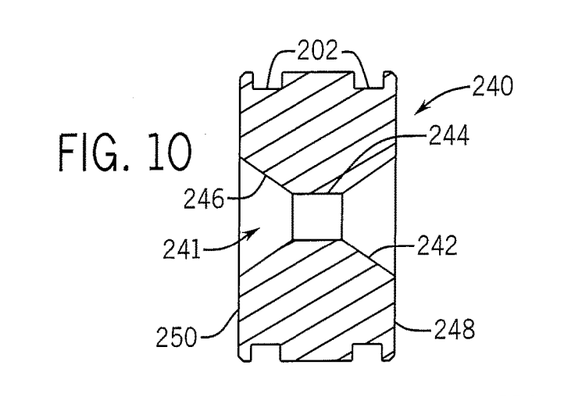
FIG. 10 is a cross-sectional side view of an embodiment of the shock-dampening floating seal insert of FIGS. 2-7, illustrating a converging-diverging internal passage tuned to certain fluid dynamics in the mineral extraction system.

FIG. 10 is a cross-sectional side view of an embodiment of a fluid-dynamic tuning floating seal insert (e.g., a shock-dampening floating seal insert) 240 of FIGS. 2-7, illustrating a converging-diverging internal passage 241 tuned to certain fluid dynamics in the mineral extraction system 10. The floating seal insert 240 includes the annular grooves 202 configured to accept annular seals (e.g., O-rings). These annular seals enable the floating seal insert 240 to maintain a seal despite movement of the insert 240. In the illustrated embodiment, the converging-diverging internal passage 241 includes a converging conical bore 242, a cylindrical bore 244, and a diverging conical bore 246 between first and second sides 248 and 250. The converging conical bore 242 may include one or more conical bores that progressively increase in diameter from the first side 248 toward the cylindrical bore 244, whereas the diverging conical bore 246 may include one or more conical bores that progressively decrease in diameter from the cylindrical bore 244 toward the second side 250. In the illustrated embodiment, the conical bores 242 and 246 are mirror images of one another (e.g., same length, angle, etc.). In certain embodiments, the conical bores 242 and 246 may be different from one another, e.g., different axial lengths, different taper angles, different starting and ending diameters, or any combination thereof. Furthermore, each conical bores 242 and 246 may include a plurality of conical bores of progressively changing taper angles. The converging-diverging internal passage 241 may be specifically tuned to the mineral extraction system, 10, such that the converging-diverging internal passage 241 is able to control fluid dynamics (e.g., dampen shockwaves, improve fluid flow, control mixing, etc.).

Figure 11:
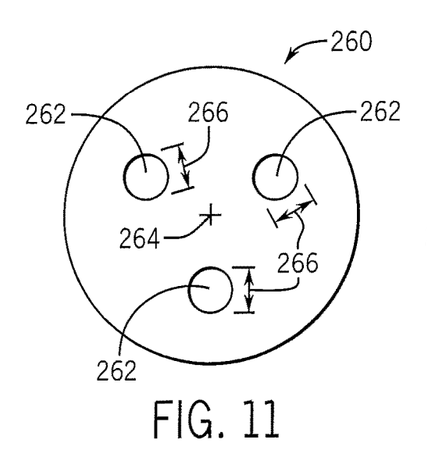
FIG. 11 is a front view of an embodiment of the shock-dampening floating seal insert of FIGS. 2-7, illustrating a set of three internal passages tuned to certain fluid dynamics in the mineral extraction system.

FIG. 11 is a front view of an embodiment of a fluid-dynamic tuning floating seal insert (e.g., a shock-dampening floating seal insert) 260 of FIGS. 2-7, illustrating a set of three internal passages 262 tuned to certain fluid dynamics in the mineral extraction system 10. As illustrated, the internal passages 262 are equally spaced about an axis 264 of the insert 260. In other embodiments, the internal passages 262 may be distributed in a non-uniform spacing. The illustrated internal passages 262 also have a uniform diameter 266. However, other embodiments may include different diameters 266 for the three internal passages 262. Although the insert 260 includes only three internal passages 262, the insert 260 may include any number of internal passages, e.g., 2 to 100. The set of three internal passages 262 may be specifically tuned to the mineral extraction system, 10, such that the set of three internal passages 262 is able to control fluid dynamics (e.g., dampen shockwaves, improve fluid flow, control mixing, etc.).

Figure 12:
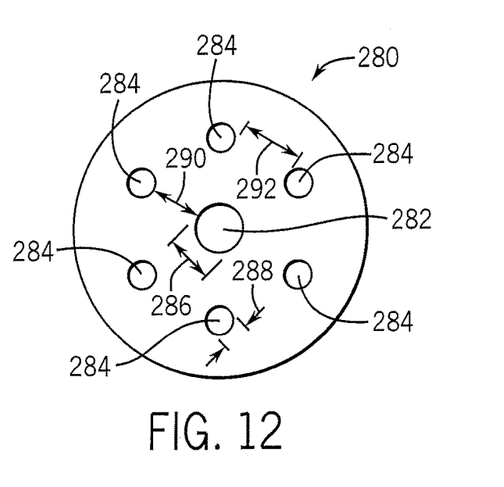
FIG. 12 is a front view of an embodiment of the shock-dampening floating seal insert of FIGS. 2-7, illustrating a set of seven internal passages tuned to certain fluid dynamics in the mineral extraction system.

FIG. 12 is a front view of an embodiment of a fluid-dynamic tuning floating seal insert (e.g., a shock-dampening floating seal insert) 280 of FIGS. 2-7, illustrating a set of seven internal passages 281 tuned to certain fluid dynamics in the mineral extraction system 10. As illustrated, the passages 281 include a central passage 282 surrounded by six equally spaced passages 284, wherein the central passage 282 has a diameter 286 larger than a diameter 288 of the surrounding passages 284. In other embodiments, the passages 281 may be non-uniformly spaced, e.g., the passages 284 may be disposed at different radial distances 290 from the central passage 282 and/or the passages 284 may be disposed at different offset distances 292 from one another. In another embodiment, the central passage 282 may have a diameter 286 smaller than the diameter 288 of the surrounding passages 284 and/or the diameter 288 may vary among the passages 284. Although the illustrated insert 280 includes seven internal passages 281, the insert 280 may include any number of internal passages, e.g., 2 to 100. The set of seven internal passages 281 may be specifically tuned to the mineral extraction system, 10, such that the set of seven internal passages 281 is able to control fluid dynamics (e.g., dampen shockwaves, improve fluid flow, control mixing, etc.).

Furthermore, while the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:
1. A kit, comprising:
   a conduit fitting, comprising:
      an internal fluid passage having an inner diameter;
      a first coupling configured to couple the internal fluid passage to a first fluid passage; and
      a second coupling configured to couple the internal fluid passage to a second fluid passage; and
   a plurality of floating inserts each having an outer diameter sized to fit within the inner diameter of the internal fluid passage, wherein the plurality of floating inserts are mutually exclusively insertable into the internal fluid passage, wherein each floating insert of the plurality of floating inserts has a differently sized fluid passage configured to tune a fluid dynamic characteristic, wherein each floating seal insert of the plurality of floating seal inserts comprises an exterior surface that is closed relative to the differently sized fluid passage along an entire length of the floating seal insert from a first axial end to a second axial end of the floating seal insert, and wherein each floating insert of the plurality of floating inserts is configured to move along an axial range of movement after installation in the internal fluid passage and during fluid flow through the conduit fitting and the floating insert.

2. The kit of claim 1, comprising a first seal between the internal fluid passage and each floating insert of the plurality of floating inserts, wherein the first seal is configured to maintain a first sealed interface between the internal fluid passage and each floating insert of the plurality of floating inserts over a first axial range of movement of each floating insert of the plurality of floating inserts.

3. The kit of claim 2, wherein each floating insert of the plurality of floating inserts comprises the first seal disposed in a first annular groove in each floating insert of the plurality of floating inserts.

4. The kit of claim 3, wherein each floating insert of the plurality of floating inserts comprises a second seal disposed in a second annular groove in each floating insert of the plurality of floating inserts, wherein the second seal is axially offset from the first seal.

5. The kit of claim 1, wherein each floating insert of the plurality of floating inserts comprises a restricted fluid passage configured to enable fluid flow and dampen shockwaves.

6. The kit of claim 5, wherein each restricted fluid passage is tuned to characteristics of the shockwaves including frequency and amplitude.

7. The kit of claim 1, wherein at least one of the plurality of floating inserts comprises a plurality of fluid passages.

8. The kit of claim 1, wherein at least one of the plurality of floating inserts comprises a restricted fluid passage having a diameter that varies from an upstream side to a downstream side of the floating insert.

9. The kit of claim 1, comprising a mineral extraction component having the conduit fitting.

10. A kit, comprising:
a plurality of floating inserts each having an outer diameter sized to fit within a common inner diameter of an internal fluid passage, wherein the plurality of floating inserts are mutually exclusively insertable into the internal fluid passage, wherein each floating insert of the plurality of floating inserts has a differently sized fluid passage configured to tune a fluid dynamic characteristic, wherein each floating seal insert of the plurality of floating seal inserts comprises an exterior surface that is closed relative to the differently sized fluid passage along an entire length of the floating seal insert from a first axial end to a second axial end of the floating seal insert, and wherein each floating insert of the plurality of floating inserts is configured to move along an axial range of movement after installation in the internal fluid passage and during fluid flow through the conduit fitting and the floating insert.

11. The kit of claim 10, comprising a conduit fitting with the internal fluid passage.

12. The kit of claim 11, wherein the conduit fitting comprises a first coupling configured to couple the internal fluid passage to a first fluid passage, and
a second coupling configured to couple the internal fluid passage to a second fluid passage.

13. The kit of claim 10, comprising a first seal between the internal fluid passage and each floating insert of the plurality of floating inserts, wherein the first seal is configured to maintain a first sealed interface between the internal fluid passage and each floating insert of the plurality of floating inserts over a first axial range of movement of each floating insert of the plurality of floating inserts.

14. The kit of claim 13, wherein each floating insert of the plurality of floating inserts comprises the first seal disposed in a first annular groove in each floating insert of the plurality of floating inserts.

15. The kit of claim 14, wherein each floating insert of the plurality of floating inserts comprises a second seal disposed in a second annular groove in each floating insert of the plurality of floating inserts, wherein the second seal is axially offset from the first seal.

16. The kit of claim 10, wherein each floating insert of the plurality of floating inserts comprises a restricted fluid passage configured to enable fluid flow and dampen shockwaves.

17. The kit of claim 16, wherein each restricted fluid passage is tuned to characteristics of the shockwaves including frequency and amplitude.

18. The kit of claim 10, wherein at least one of the plurality of floating inserts comprises a plurality of fluid passages.

19. The kit of claim 11, comprising a mineral extraction component having the conduit fitting.

20. The kit of claim 1, wherein each floating insert of the plurality of floating inserts comprises a first seal interface axially offset from a second seal interface, wherein the first seal interface is configured to seal between the floating insert and the internal fluid passage, wherein the second seal interface is configured to seal between the floating insert and a second internal fluid passage of a component being coupled to the conduit fitting.

21. The kit of claim 1, wherein the exterior surface is annular.

22. The kit of claim 21, wherein at least one floating insert of the plurality of floating inserts has a plurality of fluid passage spaced apart from one another.

23. The kit of claim 22, wherein the plurality of fluid passages are sized different from one another.

24. A kit, comprising:
a plurality of floating inserts, wherein the plurality of floating inserts are mutually exclusively insertable into an internal fluid passage, wherein each floating insert of the plurality of floating inserts has a differently sized fluid passage configured to tune a fluid dynamic characteristic, wherein at least one of the plurality of floating inserts comprises a restricted fluid passage having a diameter that varies from an upstream side to a downstream side of the floating insert, wherein each floating seal insert of the plurality of floating seal inserts comprises an exterior surface that is closed relative to the differently sized fluid passage along an entire length of the floating seal insert from a first axial end to a second axial end of the floating seal insert, and wherein each floating insert of the plurality of floating inserts is configured to move along an axial range of movement when inserted into the internal fluid passage.

* * * * *